April 29, 1941.  S. B. TERRY ET AL  2,239,981
INTERNAL DIMENSION GAUGE
Filed June 22, 1938
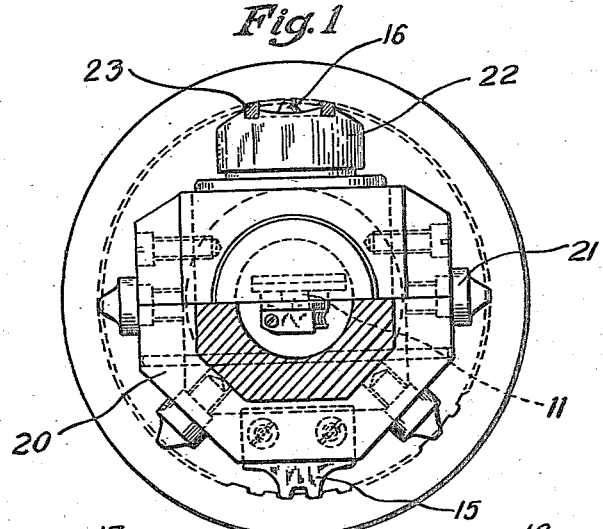
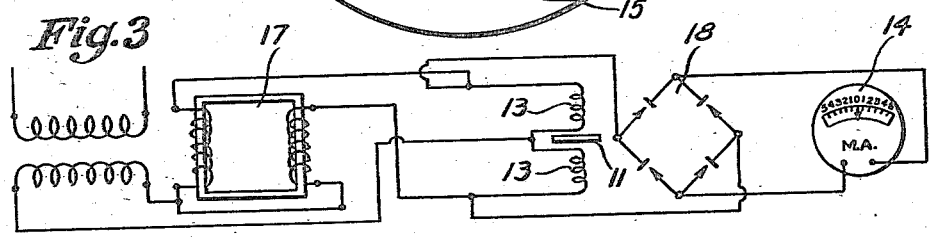
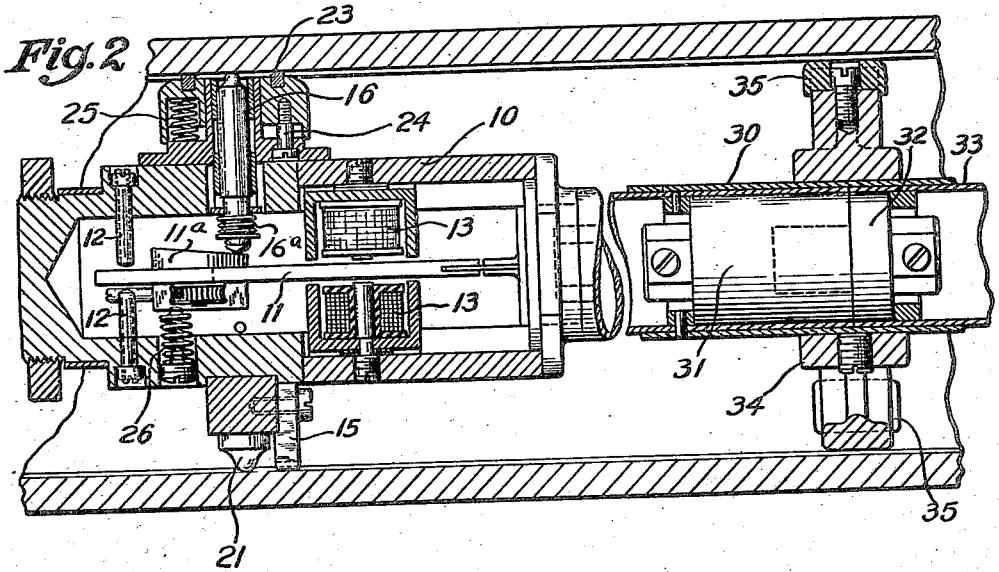
INVENTOR
S. B. TERRY
R. S. FOX
BY Joseph N. Schofield
ATTORNEY Patented Apr. 29, 1941

2,239,981

UNITED STATES PATENT OFFICE 2,239,981

INTERNAL DIMENSION GAUGE

Spencer B. Terry, West Hartford, and Raymond S. Fox, Hartford, Conn., assignors to Niles-Bement-Pond Company, Hartford, Conn., a corporation of New Jersey Application June 22, 1938, Serial No. 215,190

4 Claims. (Cl. 33—178)

This invention relates to dimension gauges and particularly to a gauge for determining variations in the diameter of elongated bores such as pipes, gun barrels and other objects the internal diameters of which require extremely precise determination.

An object of the invention is to provide a gauge adaptable over a wide range of internal dimensions and which with appropriate work contacting members can be used for gauging the variations in diameters of plain, cylindrical or rifled cylindrical bores of heavy ordnance.

A feature which is of importance is that the body portion of the gauge, by the application of a particular yoke member thereto extending only partially about the periphery of the body member, may be adapted for any one of a number of different diameters and character or rifling depending upon what particular work contacting members are mounted on the yoke member.

Another feature of importance is that an elongated tubular member built up in sections may be detachably attached to the gauge so that the gauging head may be advanced throughout the bore of the member being gauged and the variations in its diameter from one end to the other indicated at one end thereof.

Another feature that is advantageous is that the gauge head has induction coils therein between which an armature is oscillated by variations in diameter and the indicating instrument such as a milliammeter, rectifier and transformers necessary in the circuit may be at any distance from the coils, the cable connecting these parts of the circuit with the coils being of any length and for convenience made up in sections.

With the above and other objects in view, the invention includes the features of construction and operation set forth in the following specification and illustrated in the accompanying drawing.

In the accompanying drawing annexed hereto and forming a part of this specification, we have shown our invention embodied in a gauge for determining the variations in bore or diameter of a rifled gun barrel through out its length, but it will be understood that the invention can be otherwise embodied and that the drawing is not to be construed as defining or limiting the scope of the invention, the claims appended to this specification being relied upon for that purpose.

In the drawing:

Figure 1 is a transverse view of a complete gauge made in accordance with the present invention, one half of this view being an end view taken from the left in Fig. 2 and the other, or lower half of the figure being a transverse section taken just inside the cap member of the gauge.

Fig. 2 is a longitudinal view of a complete gauge head and a portion of the tubular extension secured thereto shown in Fig. 1, parts being shown in cross section, and Fig. 3 is a diagram showing an electric circuit by means of which indications of the variations in diameter may be determined at an operating end of the gauge upon a suitable indicating instrument.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a body member preferably of generally cylindrical or polygonal form which is provided with an elongated longitudinal opening within which the operative members of the gauge head are movably mounted; and second, an elongated sectional extension through which an electric cable may extend in section to the end of the bore being gauged.

As shown most clearly in Fig. 2, the body member 10 encloses a flexibly mounted armature 11, one end of which is mounted on the body member 10 and which moves between limited adjustable positions determined by limiting screws 12. Induction coils 13 above and below the armature 11 as viewed in Fig. 2 through which a current of low voltage passes indicates upon a suitable electric indicating or recording instrument 14 any variation in the diameter of the bore engaged by a fixed contacting member 15 and a radially movable contactor 16. As the electric circuit and the induction coils 13 employed in this form of gauge are or may be similar in every way to those described in the patents granted Terry 2,007,840 and 2,122,664, further description of the electrical parts of the gauge is not thought to be necessary. It will be understood that a transformer 17, rectifier 18 and indicating instrument 14 included in the circuit may be mounted independently of the body member 10 and adapted to be connected thereto by sectional lengths of tubular members 30 through which the necessary cables may extend.

Referring more in detail to Fig. 1, it will be seen that the body member 10 is surrounded upon opposite sides and its lower portion with a yoke member 20 closely fitting the outside surface of the body member 10 and attached rigidly but detachably thereto by means of suitable screws. It will be understood that the yoke 20 may have different types of contactors 21 inserted at spaced positions adapted at their outer ends to engage the internal surface being gauged, that shown in Fig. 1 being a small rifled bore. The contactors 21 serve to maintain the body member in proper position within the bore being gauged but do not perform any part of the gauging operation. By removing and substituting other yokes 20 with different length bore contacting members 21 the gauge may be quickly adapted for operations upon widely different diameters.

The upper surface of the body member 10 as shown in Fig. 1 not engaged by the yoke member is provided with a spring pressed contacting member 22 of relatively large size preferably having a bearing strip or annulus 23 adapted to contact with a portion of the internal diameter being gauged. Means to limit radial movement of this member are provided in the form of spaced screws 24 (one only of which is shown) slightly from the upper surface of the body member 10 and permitting slight "in" and "out" movement of this bearing member. One or more springs 25 engaging this member 22 normally force the member 22 outwardly into contact with the internal surface being gauged. The spring pressed member 22 is forced outwardly with sufficient pressure by springs 25 to support the weight of the body member 10 and associated parts when the rifling of the bore rotates the body member to inverted positions. This rotation of the body member 10 is effected by the contactor 15 formed to enter one or more grooves of the rifling and causing the body member 10 to slowly change position as the gauge traverses the length of the bore. Movable contactor 16 and the member 22 are diametrically opposite the contactor 15. Movement radially of the contactor 16 will therefore accurately indicate variations in diameter of the bore being gauged. Centrally disposed within this spring pressed member 22 is the movable contactor 16 normally pressed lightly inwardly against the armature 11 by a helical spring 16ª surrounding the inner end of member 16. The member 16 and the armature are forced outwardly by the armature spring 26 which is stronger than spring 16ª. The inner end of the member 16 rests upon the cam surface of a rotatable member 11ª mounted upon the armature 11. By rotating this member 11ª the gauge may be adjusted for relatively small variations in diameter without removal of the bore engaging members 21 and substitution of others. This armature 11, as shown in Fig. 2, is forced normally toward its outer or maximum diameter position by this spring 26 so that the movable contactor 16 is constantly normally held in its outermost position relative to the body member 10.

Extending from one end of the body member 10 is an elongated tubular member 30 the outer end of which is provided with a portion of a three wire locking connection 31 the companion piece 32 of which is housed in the forward end of a corresponding tubular section 33. By putting sections 33 adjacent each other with the companion parts of the connectors 31 and 32 in interlocking positions circuits including the induction coils 13 may be extended to the extreme end of the member being gauged.

Preferably at these joints in the tubular sections 33 there may be mounted supporting members 34 in the form of flanges having contacting members 35 inserted in their periphery adapted to slide freely within the bore being gauged. By substituting different types of contacting members 35 in these flanges or discs 34 the gauge may be adapted for widely different diameters.

We claim as our invention:

1. An internal dimension gauge comprising in combination, a body member, fixed bore contact-combination, a body member, fixed bore contacting members removably secured thereto, a radially movable bore contacting member disposed diametrically opposite one of said fixed contacting members, means normally forcing said movable contacting member into contact with said bore, a spring pressed bearing member surrounding said movable contacting member and forcing one of said fixed contacting members constantly into contact with the bore being gauged, means engaging said movable contacting member, a member actuated thereby to indicate the radial position of said movable member, and an extension attached to said body member having a supporting member thereon, whereby said gauge may be maintained in successive gauging positions along a bore being gauged.

2. An internal dimension gauge comprising in combination, a body member, a yoke member secured to the outside of said body member, fixed bore contacting members removably secured to said yoke member adapting said gauge to a predetermined size, a radially movable contacting member oppositely disposed to one of said fixed contacting members, means normally forcing said movable contacting member into contact with said bore, means engaging said movable contacting member and controlled by movements thereof to indicate the position of said movable contacting member, and an extension attached to said body member having a supporting member thereon, whereby said gauge may be maintained in successive gauging positions along a bore being gauged.

3. An internal dimension gauge comprising in combination, a body member, a yoke member detachably mounted on said body member and extending partially about the periphery thereof, fixed bore contacting members secured thereon, a radially movable contacting member within said body member oppositely disposed to one of said fixed contacting members on said yoke, said yoke member being removable from said body member while said movable contacting member remains in place, means normally forcing said movable member into contact with said bore, means engaging said movable contacting member, means controlled thereby to indicate the position of said movable contacting member, and an extension attached to said body member having a supporting member thereon, whereby said gauge is maintained in proper gauging position at successive positions along a bore being gauged.

4. An internal dimension gauge for rifled bores comprising in combination, a body member, a yoke member detachably mounted thereon and extending partially about the periphery thereof, fixed bore contacting members secured to said yoke member, a plate on said yoke having portions engaging the rifling of said bore and rotating the gauge with said rifling as the gage is advanced along the bore, a radially movable contacting member disposed oppositely to said plate, said yoke member and plate being removable from said body member while said movable contacting member remains in place, means normally forcing said movable contacting member into contact with said bore, means mounted within said body member and engaging said movable contacting member, means controlled thereby to indicate the position of said movable contacting member, and an extension attached to said body member having a supporting member thereon, whereby said gauge is maintained in gauging position at successive positions along a bore being gauged.

SPENCER B. TERRY.
RAYMOND S. FOX.